(12) United States Patent
Papavero et al.

(10) Patent No.: US 9,084,499 B2
(45) Date of Patent: Jul. 21, 2015

(54) BUTTER DISPENSER

(76) Inventors: Emily Ann Papavero, Redlands, CA (US); Anthony Tad Papavero, Redlands, CA (US)

( * ) Notice: Subject to any disclaimer, the term of this patent is extended or adjusted under 35 U.S.C. 154(b) by 632 days.

(21) Appl. No.: 13/469,099

(22) Filed: May 11, 2012

(65) Prior Publication Data

US 2012/0294663 A1    Nov. 22, 2012

Related U.S. Application Data

(60) Provisional application No. 61/484,796, filed on May 11, 2011.

(51) Int. Cl.
| | |
|---|---|
| *A47G 19/26* | (2006.01) |
| *A47G 19/18* | (2006.01) |
| *A47J 9/00* | (2006.01) |
| *B65D 83/00* | (2006.01) |

(52) U.S. Cl.
CPC .............. *A47G 19/26* (2013.01); *A47G 19/18* (2013.01); *A47J 9/001* (2013.01); *B65D 83/0005* (2013.01); *B65D 83/0011* (2013.01); *B65D 83/0033* (2013.01)

(58) Field of Classification Search
USPC ................ 401/12, 75, 52, 175; 222/390; 411/333–336
See application file for complete search history.

(56) References Cited

U.S. PATENT DOCUMENTS

| | | | | | |
|---|---|---|---|---|---|
| 4,298,036 | A | * | 11/1981 | Horvath ........................ | 141/1 |
| 4,544,083 | A | * | 10/1985 | Schroeder ..................... | 222/47 |
| 6,082,918 | A | * | 7/2000 | Gueret .......................... | 401/126 |
| 6,905,272 | B2 | * | 6/2005 | Yamanaka ..................... | 401/70 |
| 7,249,906 | B2 | * | 7/2007 | Kessler et al. ................ | 401/125 |

* cited by examiner

*Primary Examiner* — David Walczak
(74) *Attorney, Agent, or Firm* — Eric Karich; Karich & Associate

(57) ABSTRACT

A butter dispenser has a dispensing mechanism for dispensing a stick of butter from a housing or container whereby the dispensing mechanism may be separate from or integrated with the housing for containing the butter. The butter dispenser further provides for a dispensing mechanism that includes an automatically retractable dispensing mechanism for reloading the butter without requiring manual retraction of the dispensing mechanism to its fully retracted state.

11 Claims, 13 Drawing Sheets

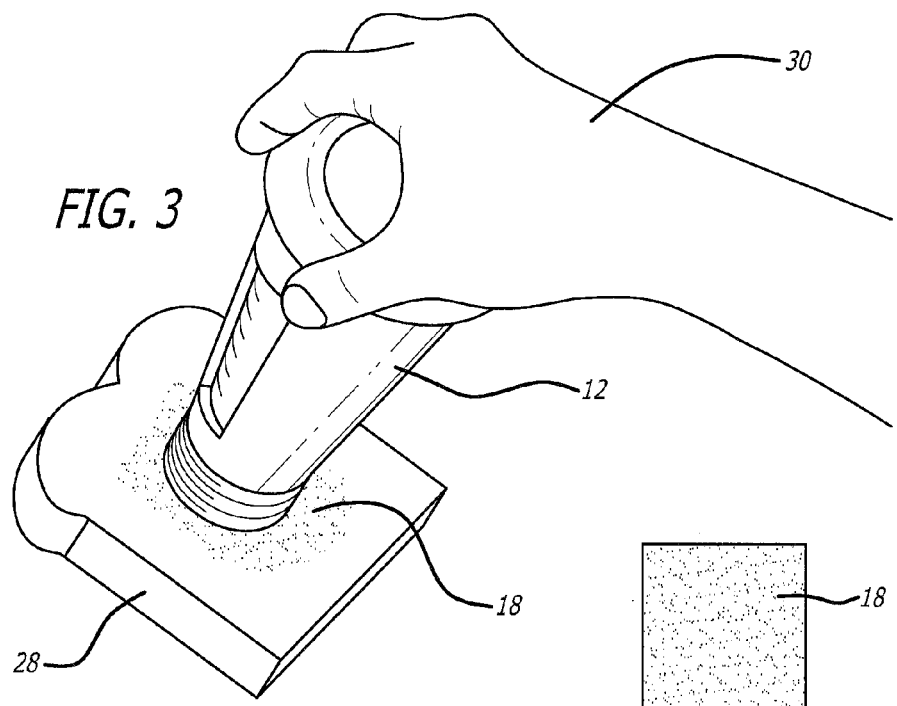
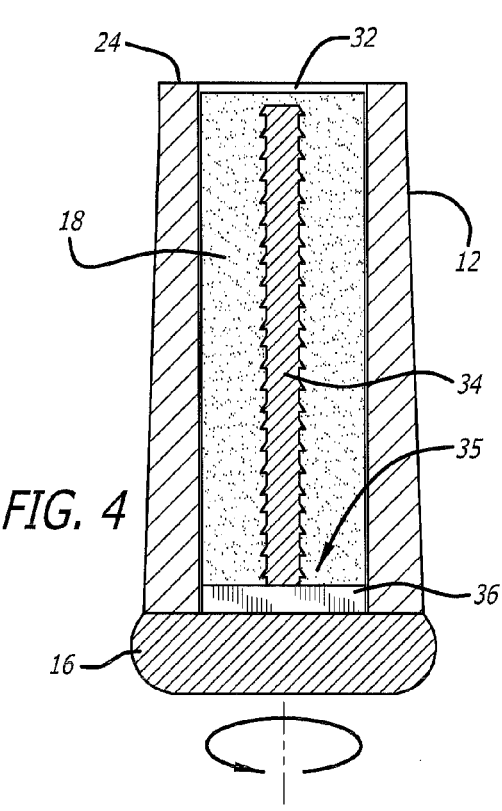
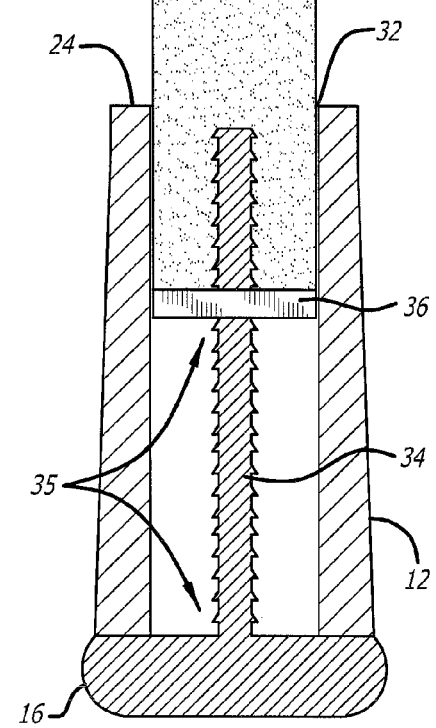

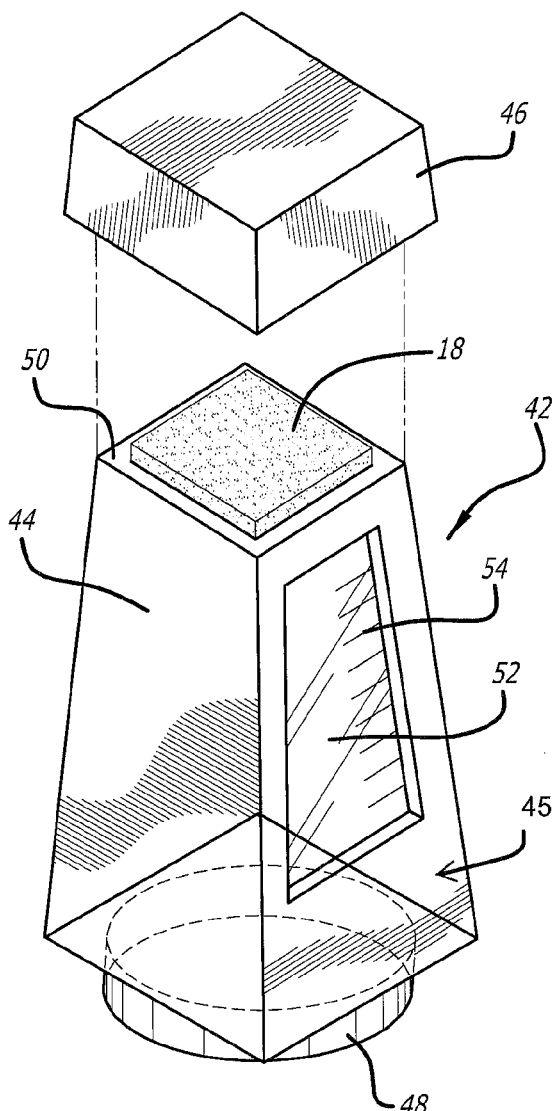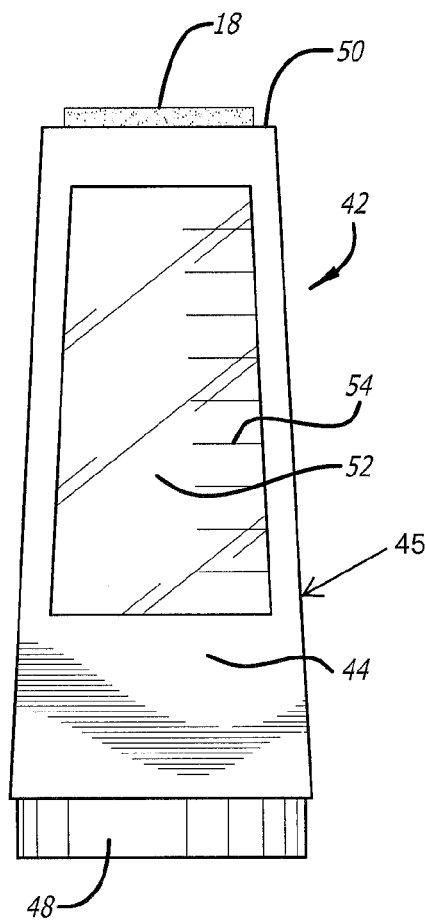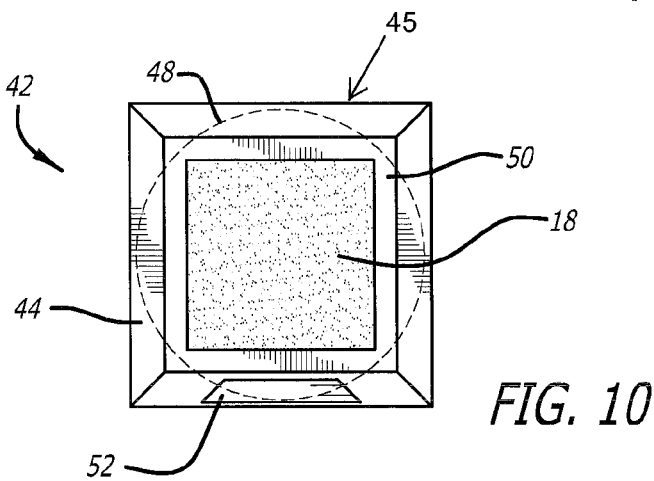
FIG. 8
FIG. 9
FIG. 10

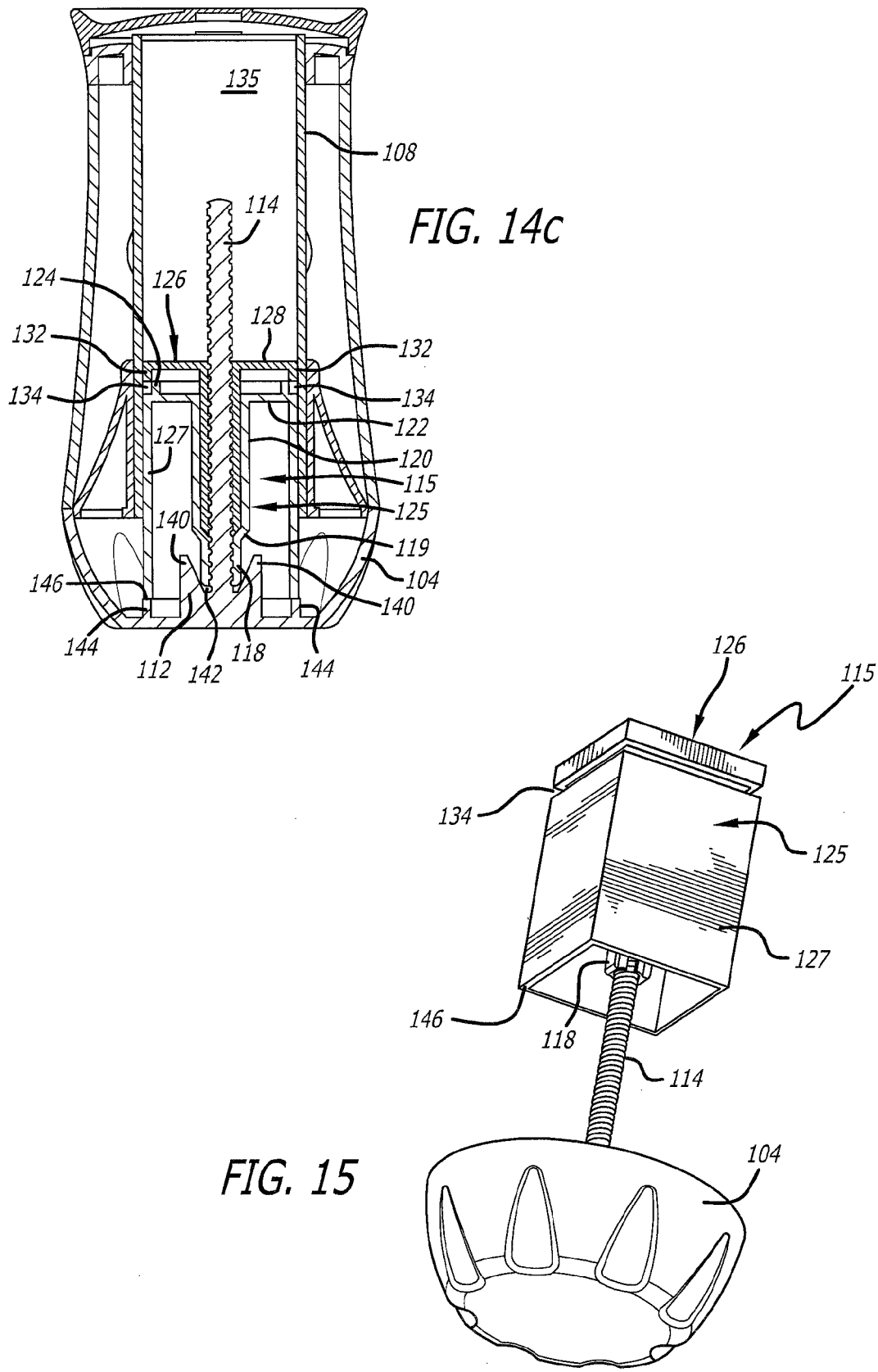

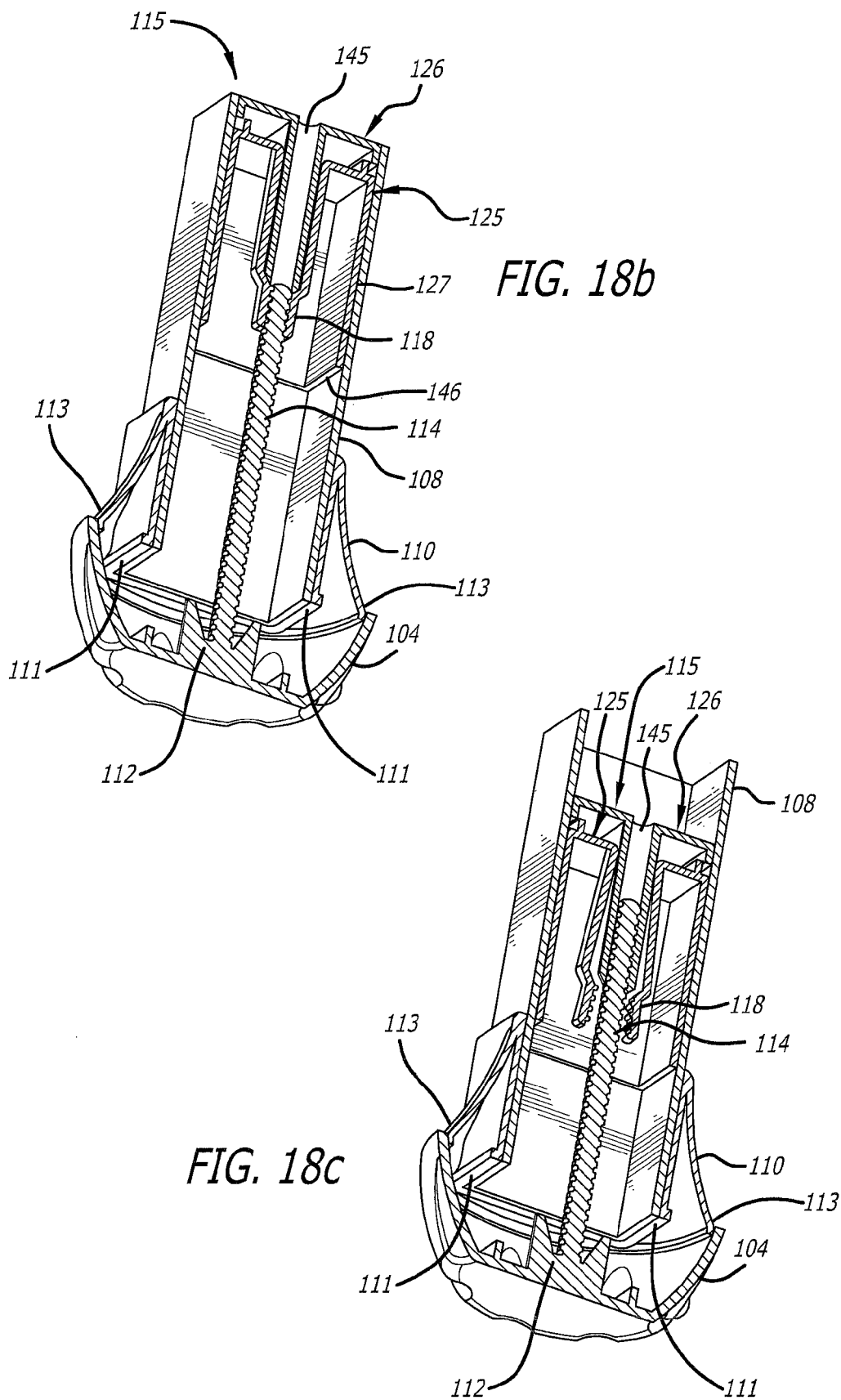

BUTTER DISPENSER

BACKGROUND OF THE INVENTION

1. Field of the Invention

A butter dispenser and more particularly a butter dispenser for receiving a standard size stick of butter and incrementally dispensing the stick of butter in a manner that permits a user to apply the butter directly to foods.

2. Related Art

Butter dispensers have been known for many years; however, inefficiencies in current butter dispensers found on the market continue to exist. Butter dispensers of highly simplistic design do not generally permit for a user to receive a standard sized stick of butter without requiring the shape of the stick of butter to be altered to fit within the dispenser. Butter dispensers that accept standard sized sticks of butter without alteration are generally complicated in mechanical operation or designed for a particular purpose. For example, many butter dispensers are designed only for buttering corn. Other butter dispensers are designed for purposes of dispensing pads of butter or ribbons of butter which are not particularly useful in applying butter directly to various foods, such as toast. Further, those butter dispensers designed to dispense butter for universal application onto general food types are poorly constructed making dispensing difficult.

A need therefore exists for a simplified butter dispenser that accepts a standard sized stick of butter and that incrementally dispenses the stick of butter in a matter that permits a user to apply the butter directly to food without complication and without requiring extra effort on the part of the user.

A need further exists for a butter dispenser that includes an automatically retracting dispensing mechanism for receiving a new stick of butter. A further need exists for a butter dispenser being made, at its dispensing end, from a heat resistant material, allowing for the butter to be applied directly to hot surfaces during cooking preparations.

SUMMARY

A butter dispenser is provided having a dispensing mechanism for dispensing a stick of butter from a housing or container whereby the dispensing mechanism may be separate from or integrated with the housing for containing the butter. The butter dispenser further provides for an automatically retractable dispensing mechanism for reloading the butter without requiring manual retraction of the dispenser to its fully retracted state.

Optionally, the dispenser may be provided with a window in the housing having increments for measuring quantities dispensed from the butter dispenser. Such quantities may be measurements or calories, for example. The dispenser may further include an integrated knife and may be design from heat resistant materials, at least at the dispensing end, to allow for the butter to be applied directly to hot surfaces during cooking preparations. While the invention is described in the context of a butter dispenser, other semi-solid state products, such as margarine, for example, may be dispensed using the dispenser of the present invention.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 3 illustrates the butter dispenser of FIG. 1 as it may appear in use.

FIG. 4 is a cross-sectional view of the butter dispenser of FIG. 1 taken along the vertical center of FIG. 1 with the dispensing mechanism in the fully-retracted position.

FIG. 5 is another cross-sectional view of the butter dispenser in FIG. 1 with the dispensing mechanism in a partially-dispensed position.

FIG. 8 is yet another example of an implementation of a butter dispenser of the invention showing the butter dispenser having a least one flat side for storing the butter dispenser on its side.

FIG. 9 is a side view of the butter dispenser of FIG. 8 illustrating hash marks along the window portion of the butter dispenser to illustrate quantity.

FIG. 10 is a top view of the butter dispenser of FIG. 8 with the cap removed.

FIG. 14c illustrates the butter dispenser of FIG. 14a with the automatically retractable mechanism in a fully retracted position.

FIG. 15 illustrates a side perspective view of the automatically retractable dispensing mechanism of the butter dispenser of FIG. 14a-c.

FIG. 18b illustrates the automatically retractable dispensing mechanism in the fully dispensed position.

FIG. 18c illustrates the automatically retractable dispensing mechanism in a partially retracted position.

DETAILED DESCRIPTION

Figure 1:
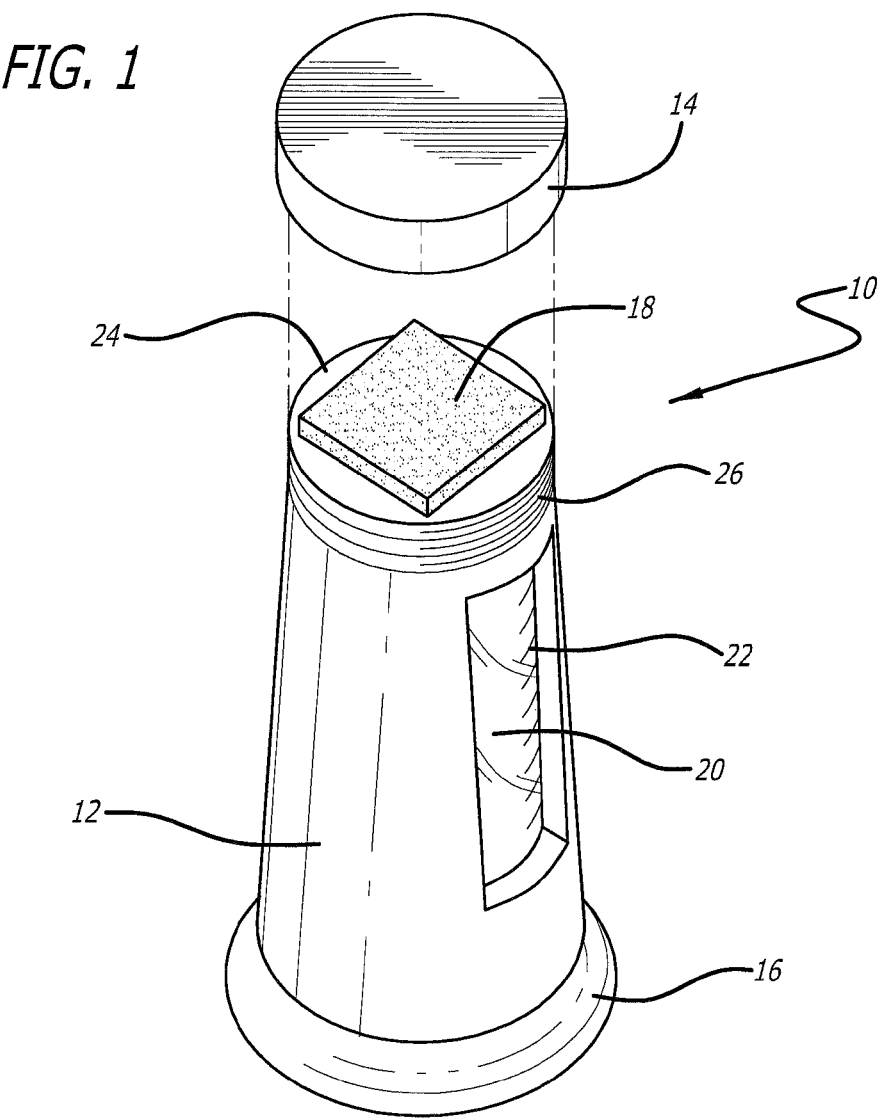
FIG. 1 is a top perspective view of one example of an implementation of a butter dispenser of the present invention.

FIG. 1 is a top perspective view of one example of an implementation of a butter dispenser 10 of the present invention. As illustrated in FIG. 1, the butter dispenser 10 includes a body or housing 12 having at its base an advancing knob 16. The body 12 includes a top surface 24 having an opening 32 (FIG. 3) for receiving a stick of butter 18. The butter dispenser 10 further includes a lid or cap 14 for covering the top surface 24 of the opening 32 (FIG. 3) to maintain the butter 18 in a closed environment.

Sticks of butter come in different sizes and shapes. For example, in the United States, the size of a stick of butter varies. Eastern-pack shaped sticks are 4¾ inches long and 1¼ inches (121 mm×32 mm) wide. Western-pack shaped sticks (sold west of the Rocky Mountains) are 3⅛ inches long and 1½ inches wide (80 mm×38 mm). Accordingly, the dimensions of the body 12 and opening 32 can vary depending upon the size of stick of butter 18 the dispenser 10 is designed to accommodate and dispense. Different sizes of dispensers in accordance with the present invention may be sold in different regions of the world or in different regions of a country depending upon the common shape of a stick of butter in that region. Further, while the application refers to the dispenser 10 as a butter dispenser 10, it is further recognized that the dispenser 10 of the present invention may accommodate and dispense sticks of margarine, or other semi-solid state products, in the same manner as it dispenses sticks of butter 18.

As further illustrated in FIG. 1, the body 12 may include threads 26 around the top portion of the body 12 just below the top surface 24. The threads 26 are for engaging corresponding interior threads (not shown) in the receiving cap 14 to keep the butter 18 covered when not in use. The body 12 further includes a window 20 that may optionally include measurement markings 22 to indicate the amount of butter 18 that remains or has been dispensed from the butter dispenser 10. Optionally, in certain applications, the measurement markings 22 may indicate calories of butter 18 dispensed, in addition to or in the alternative to the quantity dispensed.

Figure 2:
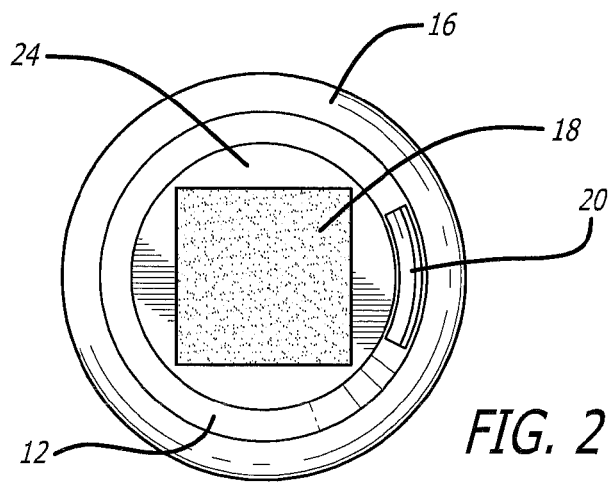
FIG. 2 is a top view of the butter dispenser of FIG. 1 with the cap removed.

FIG. 2 is a top view of the butter dispenser 10 of FIG. 1 with the cap 14 removed. FIG. 2 illustrates that the advancing knob 16 acts as a base for the butter dispenser 10. In the illustrated example, the advancing knob 16 has a circumference that is larger than the circumference of the lower end of the body 12 of the butter dispenser 10. As also see in FIG. 2, the stick butter 18 can be seen in full cross-section from the top such that the cross-section of the stick of butter 18 is exposed just above the top surface 24 of the body 12 of the dispenser 10 to butter food such as toast, corn or other foods for which it is desirable to apply butter 18. The window 20 is also seen along the side of body 12.

FIG. 3 illustrates the butter dispenser 10 of FIG. 1 as it may appear in use. As illustrated in FIG. 3, a user 30 may advance the butter 18 such that a portion of the butter 18 is raised slightly above the top surface 24 of the body 12 of the butter dispenser 10. With the butter 18 raised above the top surface 24 of the body 12 of the butter dispenser 10, the butter 18 can be applied to food, which in FIG. 3, is illustrated as a piece of toast 28. As illustrated in FIG. 3, the butter 18 is then applied to and spread across the toast 28 very easily by the user 30.

FIG. 4 is a cross-sectional view of the butter dispenser 10 of FIG. 1 taken along the vertical center of the butter dispenser 10 illustrating the dispensing mechanism 35 in the fully-retracted position. As illustrated in FIG. 4, the dispensing mechanism 35 may include a threaded shaft or rod 34 rotatably coupled to platform 36 that, upon the rotation of the advancing knob 16, is raised and lowered along the length of the shaft 34. In certain implementations, the advancing knob 16 may continuously turn without resistance until the stick of butter 18 has been pushed out of the body 12 of the butter dispenser 10. In alternative implementations, the advancing knob 16 turns incrementally, where a certain number of increments will produce a certain amount of butter 18 being dispensed above the top surface 24 of the body 12 of the butter dispenser 10.

To dispense the butter 18, the stick of butter 18 is placed in the opening 32 of the top surface 24 of the body 12. The threaded shaft 34 runs through the center and bottom of the stick of butter when positioned completely within the opening 24 of the dispenser 10 such that the bottom of the stick of butter 18 is resting on platform 36. Platform 36 when in the fully retracted position sets against or near the upper portion of the advancing knob 16. The advancing knob 16 when rotated, rotates the platform 36 upward along threaded shaft 34 to push the butter 18 out of opening 32 above the top surface 24 of the body 12.

FIG. 5 is another cross-sectional view of the butter dispenser 10 in FIG. 1 with the dispensing mechanism 35 in a partially-dispensed position. As illustrated in FIG. 5, with the rotation of the advancing knob 16, the platform 36 moves upward along threaded shaft 34. With the advancement of platform 36 upward along shaft 34, the butter 18 is pushed upward through opening 32 and out of the top surface 24 of the butter dispenser 10. FIG. 5 illustrates the butter being dispensed ⅔ of the way out of the dispensing device 10.

While FIGS. 4 and 5 illustrate the platform being advanced upward along a threaded shaft 34 through the rotation and advancement of advancing knob 16, those skilled in the art will recognize that there are many other ways in which to dispense the butter 18 in the butter dispensing mechanism 10. A push mechanism may be utilized as well as a mechanism by which the platform 36 will automatically release from threaded rod 34 allowing for the automatic retraction of platform 36 toward the advancing knob 16 upon the insertion of a new stick of butter 18. This feature is further illustrated in connection with FIGS. 14-20 below.

Figures 6, 7:
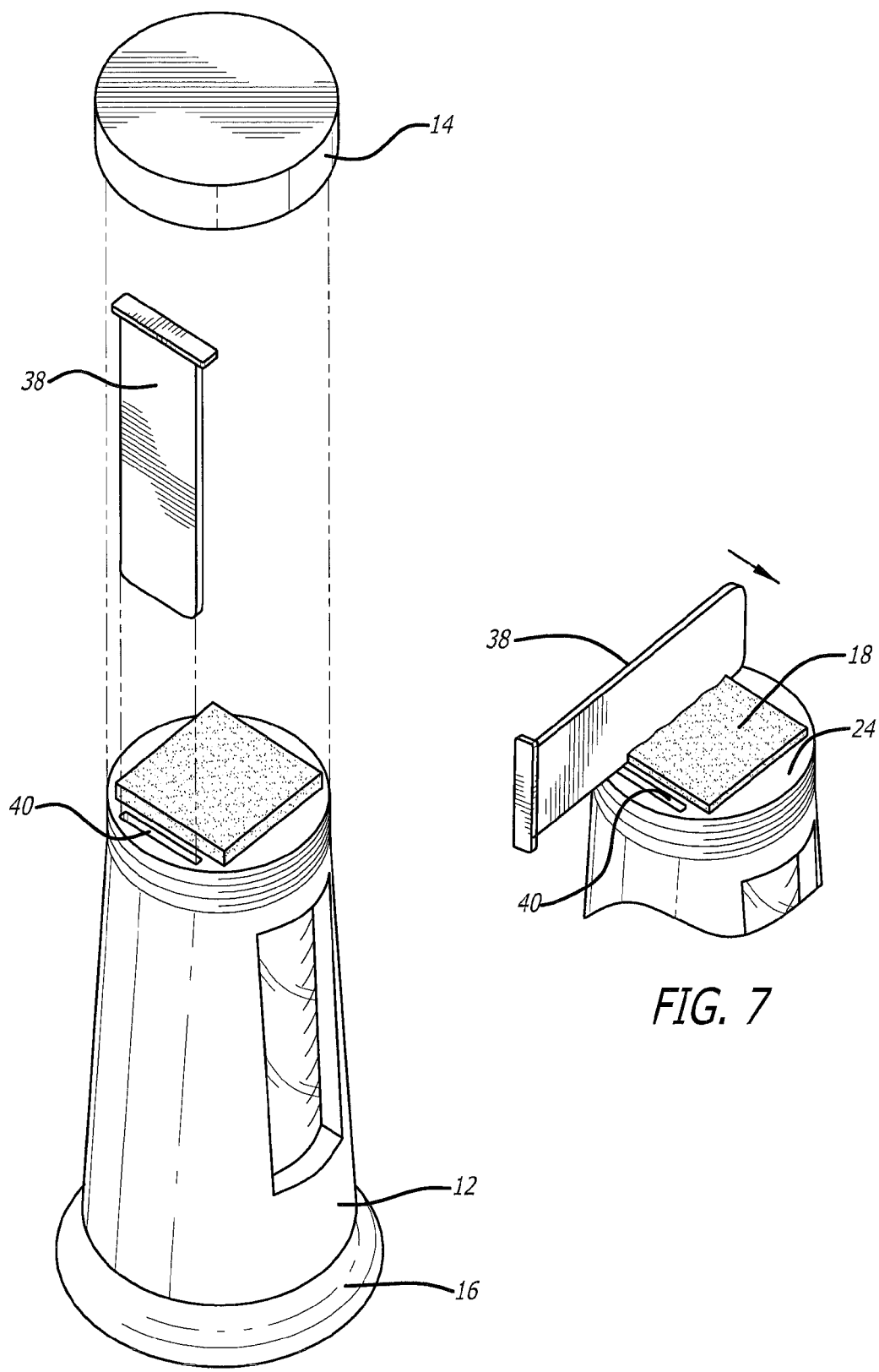
FIG. 6 is an example of another implementation of a butter dispenser where the butter dispenser includes an integrated knife.
FIG. 7 illustrates the butter dispenser of FIG. 6 as it may appear when the knife of the butter dispenser is being used to remove or clean the butter from the top of the dispenser.

FIG. 6 is an example of another implementation of a butter dispenser 10 that includes an integrated knife 38. As illustrated in FIGS. 6 & 7, an integrated knife 38 may be sold with the butter dispenser 10. In the illustrated example, the knife 38 may be positioned in a slot 40 in the top surface 24 of the body 12 of the dispensing device 10. The knife 38 may be removed from the slot 40 in the body 12 such that the knife 38 may be utilized, as illustrated in FIG. 7, to remove excess butter 18 from the top surface 24 of the butter dispenser 10. This may be used to clean the top surface 24 of the butter dispenser 10 for subsequent use. Although FIG. 6 illustrates a slot 40 for containing the knife 38 on the top surface 24 of the body 12 of the butter dispenser 10, it should be recognized that the slot 40 may be positioned at other locations on the body 12 of the butter dispenser 10, including but not limited to, the sides of the body 12, cap 14 or advancing knob 16. Alternatively, the knife 38 may simply be provided and sold with the butter dispenser 10 and not integrated into the butter dispenser 10.

FIG. 7 illustrates one example of the butter dispenser 10 of FIG. 6 as it may appear when the knife 38 of the butter dispenser 10 is being used to remove or clean the butter 18 from the top surface 24 of the butter dispenser 10. The use of the knife 38 may be helpful when required to dispense a predetermined amount of butter 18 for cooking purposes, for example.

FIG. 8 is yet another example of an implementation of a butter dispenser 42 of the invention showing the butter dispenser 42 having a body or housing 45 with at least one flat side 44 for storing the butter dispenser 42 on its side. As illustrated in FIG. 8, the butter dispenser 42 includes a body 45 that is trapezoidal in shape having four flat sides 44. The butter dispenser 42 further includes an advancing knob 48 that is at the base of the butter dispenser 42 as well as a removable cap or lid 46 that is positioned along the top surface 50 of the butter dispenser device 42. Like the example in FIG. 1, the butter dispenser 42 may include, along its body 45, a window 52 having measurement markings 54 for indicating how much butter 18 has been dispensed or remains to be dispensed and/or the caloric amount of the butter 18 being dispensed. While the butter dispenser 10 in FIG. 1 illustrates the body 12 being round in shape with a smaller circumference at the top than at the bottom of the body 12, those skilled in the art will recognize that the body 45 of the dispensing device 42 may be of any shape, including, but not limited to, the trapezoidal shape illustrated in FIG. 8. Alternatives may include, for example, round or square tubes or a generally round body with one flat side for storing the butter dispenser 10, 42 on its side. Many other types of geometric configurations may be utilized to vary the ornamental appearance of the outside of the butter dispenser 10, 42.

FIG. 9 is a side view of the butter dispenser 42 of FIG. 8 illustrating hash or measurement marks 54 along the window 52 of the butter dispenser 42. FIG. 9 also illustrates that the advancing knob 48 is smaller in circumference than the width of the bottom portion of the body 45. With the adjusting knob 48 being smaller than the width of the bottom portion of the body 45, the butter dispenser 42 may be laid on its side easily without interference from the adjusting knob 48.

While the measurement or hash marks 54 on the open windows 52 may be measurements of quantity, in certain circumstances, especially in those with prepackaged butter of a certain type, the measurement marks 54 may represent calories consumed, calories dispensed or other types of quantitative measurements.

FIG. 10 is a top view of the butter dispenser 42 of FIG. 8 with the cap 46 removed. FIG. 10 shows the butter 18 being dispensed through the top surface 50 of the butter dispenser 42. FIG. 10 also illustrates the trapezoidal shape of the body 45 with four sides 44 so that the butter dispenser 42 may be stored on its side.

Figure 11:
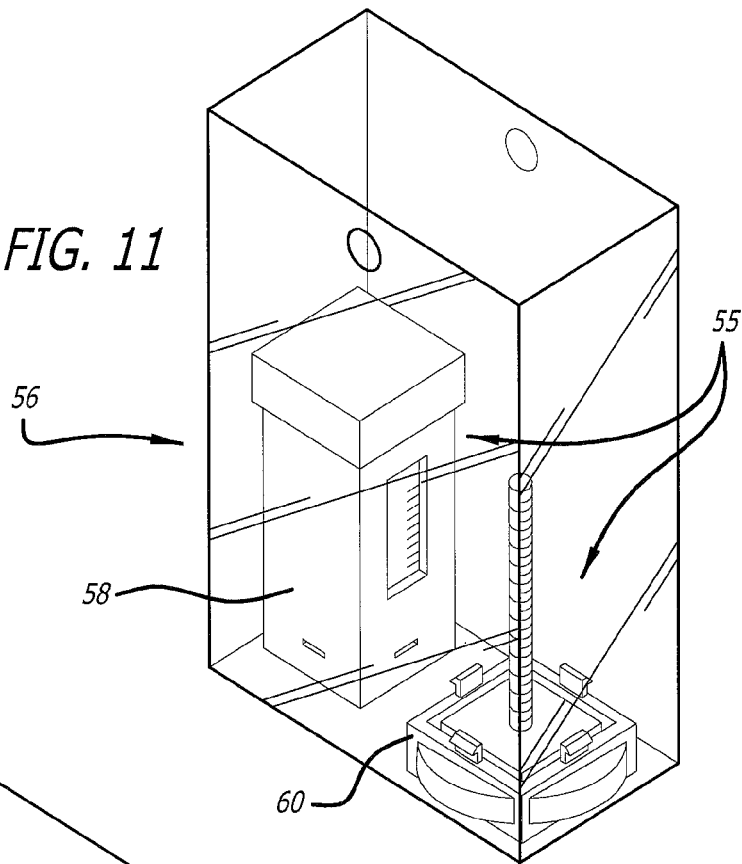
FIG. 11 is one example of a dispensing system that may be sold with prepackaged butter.

FIG. 11 is one example of a dispensing system 55 that may be sold together as a prepackaged unit 56 containing 1 stick of butter 18 in the same manner as prepackaged butter. The dispensing system 55 includes a dispensing container or housing 58 that couples to a disposable or reusable dispensing mechanism 60. As illustrated, the butter 18 may be packaged in the dispensing container 58 and the dispensing container 58 may be designed to interconnect with the dispensing mechanism 60 at its lower end. In this manner, a single serving stick of butter 18 may be sold, prepackaged, in the dispensing container 56 as a single or multi-unit pack prepackaged unit 56.

Figure 12:
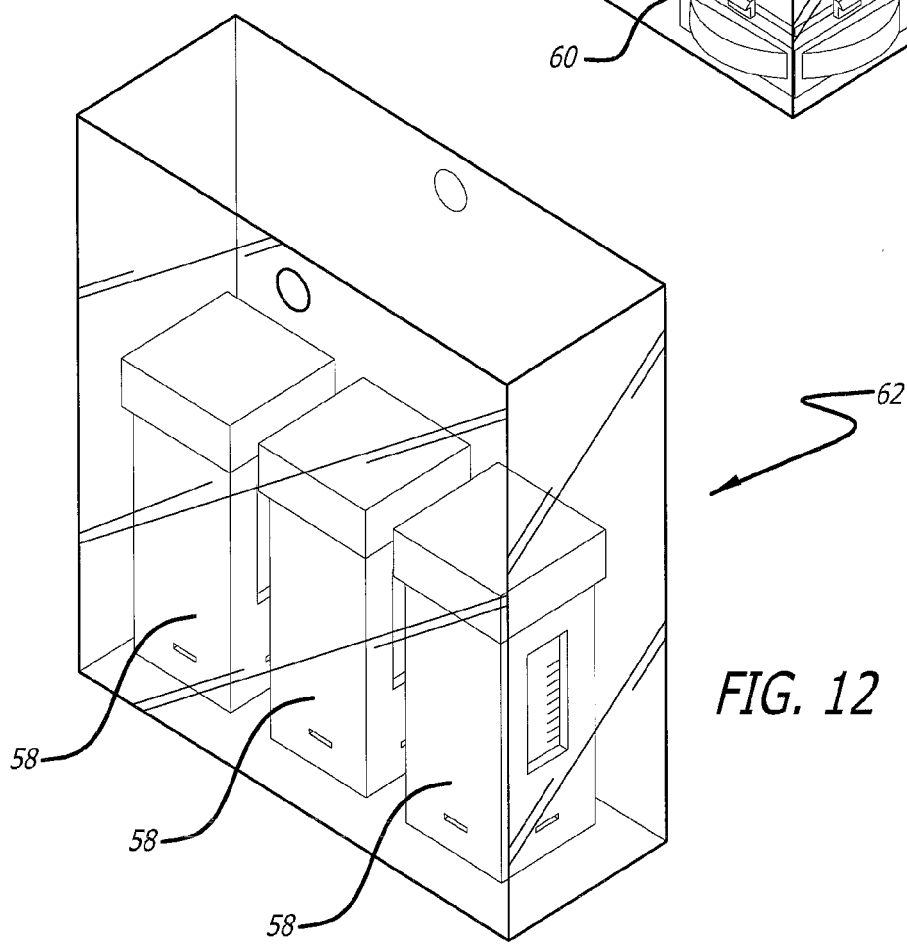
FIG. 12 illustrates dispensing containers of the dispensing system of FIG. 11 as they may appear sold with three sticks of pre-packaged butter.

For example, FIG. 12 illustrates dispensing containers 58 as they may appear sold with three sticks of pre-packaged butter in a single container 62. The multi-pack container 62 may be purchased by the consumer with a select number of sticks of butter prepackaged in dispensing containers 58 for mating with dispensing mechanism 60, as shown in FIG. 11 & FIG. 13.

Figure 13:
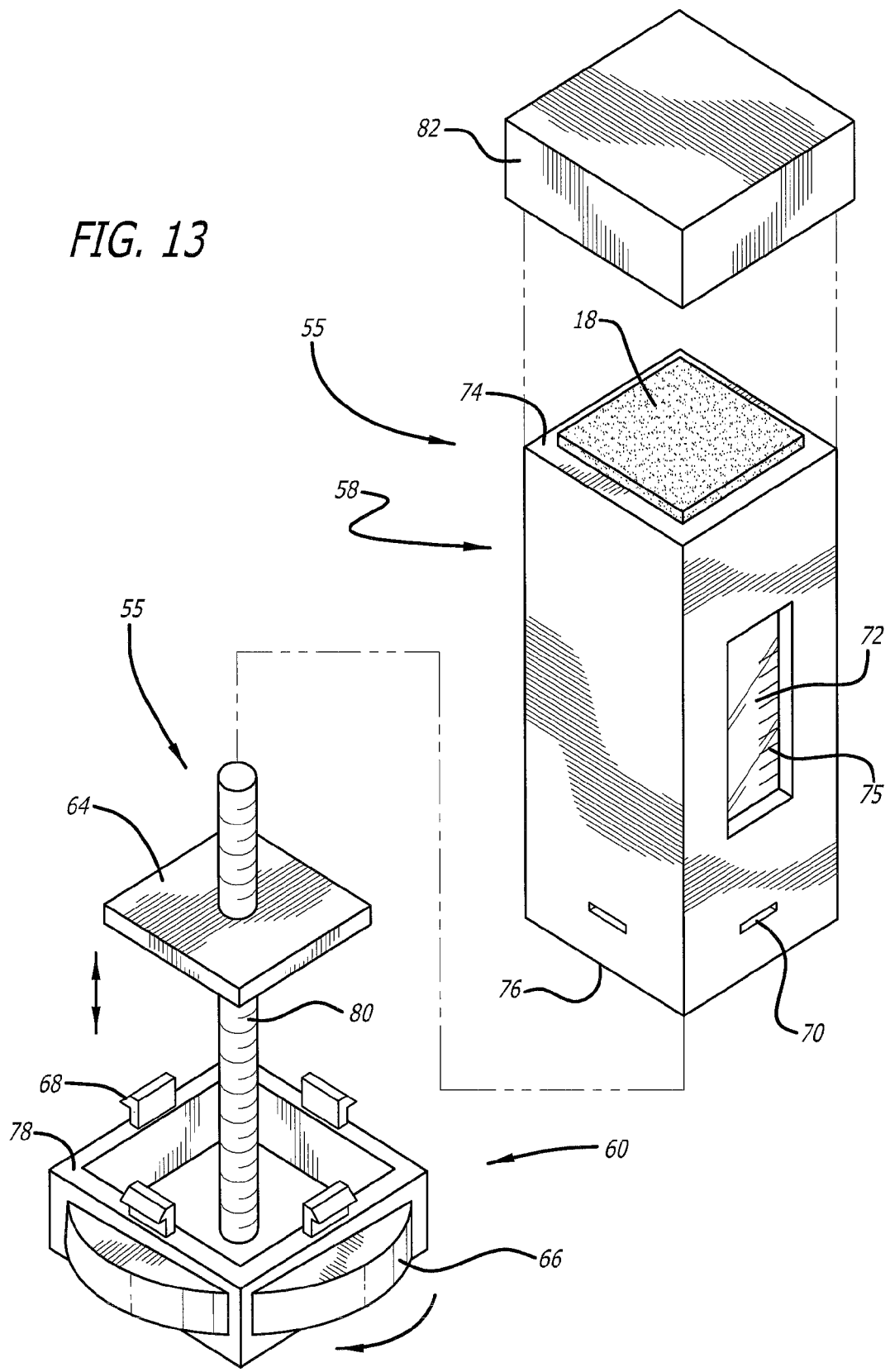
FIG. 13 illustrates an exploded view of the butter dispenser of FIG. 11 with the dispensing mechanism in a partially-dispensed position.

FIG. 13 illustrates the two part dispensing system 55 of FIG. 11, showing both the dispensing container 58 and the dispensing mechanism 60. In the illustration, the dispensing mechanism 60 in a partially-dispensed position. As illustrated in FIG. 13, the dispensing container 58 is a hollow sleeve member having an interior void, an open bottom end 76 and open top end 74. In the illustrated example, a stick of butter 18 resides within the interior void. The dispensing container 58 may function as the packaging for prepackaged stick butter 18. The butter 18 may be dispensed from the upper surface or open top end 74 and an open bottom end or lower surface 76 may attach to dispensing mechanism 60. A cap or cover 82 may be positioned over the dispensing container 58 to cover the butter 18. The container 58 may further include a window 72, which may include measurement marks 75 for indication the dispensing of certain quantities of butter 18, which may include, but not be limited to, calorie counts for the prepackaged butter 18 being dispensed.

In the illustrated FIGS. 11-13, the dispensing container 58 may include slots 70 for fastening to corresponding fastening members 68 on the base 78 of the dispensing mechanism 60. The dispensing mechanism 60 may further include a threaded rod 80 that advances a platform 64 upon the rotation of adjusting element 66. When interconnected with the dispensing container 58, the dispensing mechanism 60 will advance the platform 64 and dispense the butter 18. To advance the butter 18, the platform 64 is designed to be of the approximate same length and width as the butter 18 so that the platform 64 may move up and down within the interior end of the hollow sleeve of the dispensing container 58 when the dispensing mechanism 60 is connected to the dispensing container 58.

Those skilled in the art will recognize that there may be other ways to secure the dispensing mechanism 60 to the dispensing container 58, including through the use of friction, fasteners, threading, etc. The fastening members 68, once positioned within the slots 70, may be removed by squeezing the portion of the fastening members 68 that protrude from the slots 70 when positioned within the slots 70. Once removed, the dispensing mechanism 60 may be utilized in connection with another dispensing container 58 by inserting the threaded rod 80 into the open bottom end of the dispensing mechanism 58 and through the center of the butter 18 when the platform 64 is full retracted. When sold, the bottom of the dispensing container 58 can include a removable cover (not shown) for protecting the butter 18 from the environment at the exposed lower end. The cover could then be removed prior to the dispensing mechanism 60 being inserted into the butter 18 and engaged with the dispensing container 58.

Although the illustration shows the dispensing mechanism 60 having four fastening members 68, it may be sufficient to only include two fastening members 68. The dispensing system 55 may be made of plastic and, in certain implementations, the dispensing container 58 may be made of a rigid paper material or thin flexible plastic or rubber. Although the above implementation is described as a disposable or limited use implementation, the dispensing mechanism 60 maybe designed for continuous use, having a relatively long product life. Further, the dispensing container 58 may be designed for reuse with other prepackaged stick butter 18 sold separately and without the dispensing container 58 of the present invention.

As discussed above, the butter dispenser 10 may be designed such that the dispensing mechanism 35 is automatically retractable so that once a stick of butter 18 is completely dispensed, the next stick of butter 18 can be reloaded into the dispenser by simply pushing the end of the stick of butter 18 against the dispensing platform 36. FIGS. 14-20 illustrate one example of an implementation of a butter dispenser 100 that includes such an automatically retractable dispensing mechanism or retractable dispensing platform 115.

FIGS. 14-20 illustrate a butter dispenser 100 having a housing 102 and an advancing knob 104 positioned at the base of the housing 102. A cap or lid 106 covers the housing 102 at its top end opposite the advancing knob 104. Contained within the housing 102 is a hollow receiving sleeve 108 that is supported within the housing 102 by a sleeve support 110. The sleeve support 110 in the illustrated example, is an inverted v-shaped supports having a first and second leg 111, 113 extending between the advancing knob 104 and the hollowing receiving sleeve 108. As illustrated, the sleeve support 110 supports the hollow receiving sleeve 108 within the housing 102 at the upper end of the advancing knob 104. The advancing knob 104 includes at its interior center a threaded shaft support 112 that supports a threaded shaft 114, which extends upward through the center of the housing 102 and hollow receiving sleeve 108. The threaded shall support 112 is surrounded by perimeter circular peak 104 having a graduated valley 142. The graduated valley 142 is positioned about the threaded shaft support 112 for receiving a portion of the retractable dispensing mechanism 115, as will be further described below. The advancing knob 104 further includes perimeter stops 144 for acting as terminal stops for portions of the retractable dispensing mechanism 115, as also will be explained further below. Residing on and in engagement with the threaded shaft 114 is a retractable dispensing mechanism 115. The retractable dispensing mechanism 115 includes both a retaining mechanism 125 and a release mechanism 126, both of which will be explained in detail in connection with FIGS. 14-20 below, and which together provide the structure that allows for the dispensing mechanism to be an automatically retractable dispensing mechanism 115 that permits a stick of butter 18 to be reloaded into the butter dispenser 100 by simply pushing the end of the stick of butter 18 against the retractable dispensing mechanism 115.

Figure 14A:
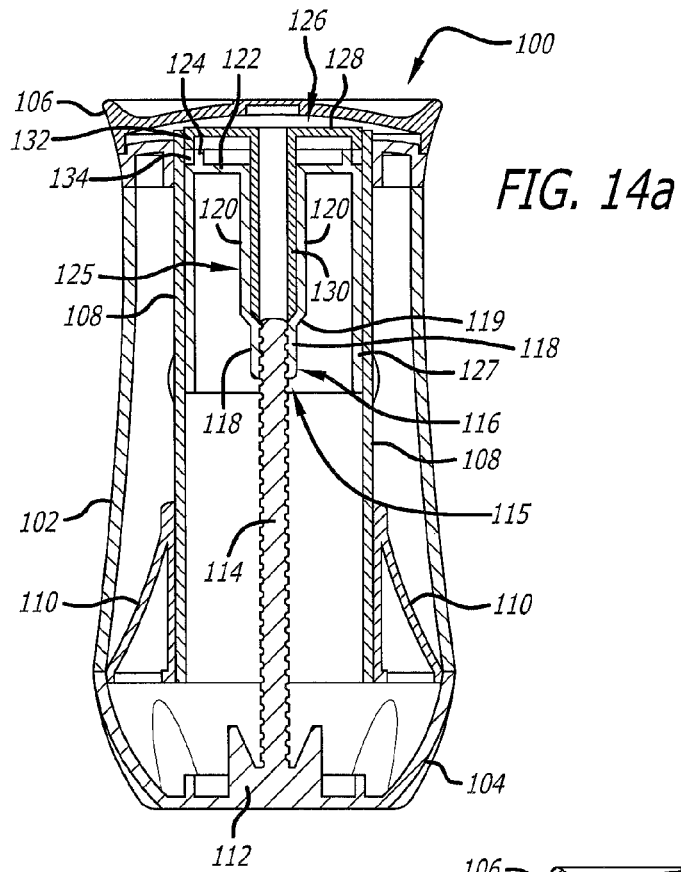
FIG. 14a illustrates a cross-section of one example of a butter dispenser with an automatically retractable dispensing mechanism illustrating the retractable dispensing mechanism in the fully-dispensed position.

FIG. 14a illustrates a cross-section of one example of a butter dispenser 100 with a retractable dispensing mechanism 115. FIG. 14a illustrates the retractable dispensing mechanism 115 in the fully-dispensed position. The retractable dispensing mechanism 115 is contained within the hollow receiving sleeve 108, which includes a void 135 for receiving a stick of butter (not shown). The hollow receiving sleeve 108 is supported within the housing 102 of the butter dispenser 100 by sleeve supports 110. The retractable dispensing mechanism 115 rotates about a threaded shaft 114, which is supported by and positioned on a threaded shaft support 112 centrally located at the center of the advancing knob 104. The retractable dispensing mechanism 115 includes a retaining member or mechanism 125 for retaining the retractable dispensing mechanism 115 in engagement with the threaded shaft 114 and a release member or mechanism 126 for releasing the retaining mechanism 125 from engagement with the shaft 114.

The retaining mechanism 125 includes interior positioned releasable fastener 116 that includes female threaded mating members 118 for engaging the threaded shaft 114 and moving the retractable dispensing mechanism 115 up and down the threaded shaft 114 in response to the rotation of the advancing knob 104. The releasable fastener 116 further includes tapered members 119 that gradually expand the diameter of the releasable fastener 116 upward and outward directly above the female threaded mating members 118 and a hollow tube 120 for receiving the release tube 130 of the release mechanism 126. The retaining mechanism 125 further includes an upper shelf 122 with raised stops 124 and extended exterior sidewalls 127 that slideably engage with the interior sidewalls of the hollow receiving sleeve 108.

The release mechanism 126 is positioned directly above upper shelf 122 of the retaining mechanism 125 and is generally of the same length and width as that of the retaining mechanism 125, which is also generally of the same length and width as the horizontal cross-section of the interior opening of the hollow receiving sleeve 108. The release mechanism 126 includes a receiving platform 128, which includes a release tube 130 at its center that projects downward and into the hollow tube 120 of the retaining mechanism 125. The receiving platform 128 includes, at its perimeter, downward extending exterior sides 132 that extend downward between the interior sidewalls of the hollow receiving sleeve 108 and the exterior sides of the raised stops 124 of the upper shelf 122 of the retaining mechanism 125.

As illustrated in FIG. 14a, in the fully dispensed position, the retractable dispensing mechanism 115 is positioned at the top of the hollow receiving sleeve 108 such that the receiving platform 128 of the release mechanism 126 is generally aligned with the top edge of the hollow receiving sleeve 108.

Figure 14B:
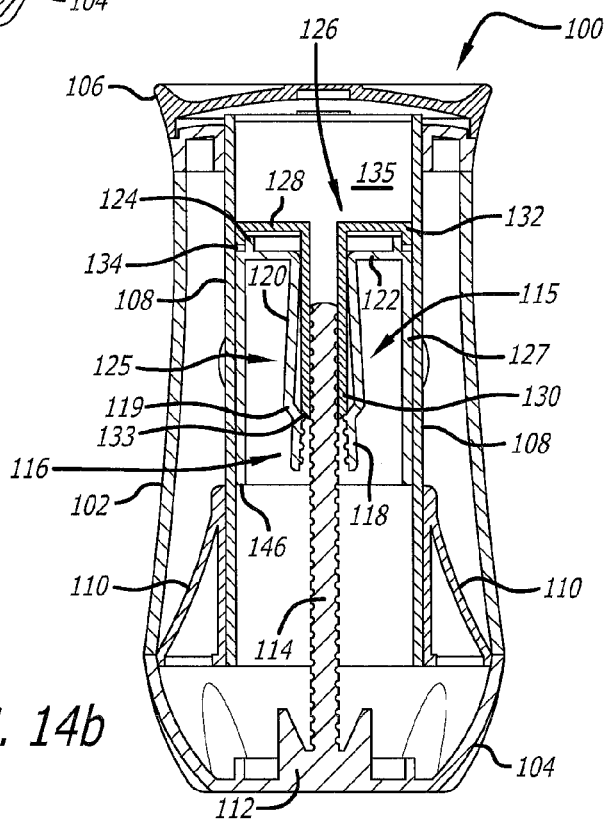
FIG. 14b illustrates the butter dispenser of FIG. 14a with the automatically retractable dispensing mechanism in a partially dispensed position.

FIG. 14b illustrates the butter dispenser 100 of FIG. 14a with the retractable dispensing mechanism 115 in a partially dispensed position. As illustrated in FIG. 14b, when in a partially dispensed position, the retractable dispensing mechanism 115 creates a void 135 which receives or holds the stick of butter (not shown). In operation, when the receiving platform 128 of the release mechanism 126 receives downward pressure, angled tube ends 133 at the lower end of the release tube 130 of the release mechanism 126 press upon the tapered member 119 of the retaining mechanism 125 pushing the female threaded mating members 118 away from the threaded shaft 114, thereby disengaging the retaining mechanism 125 from engagement with the threaded shaft 114. Upon disengagement, the retractable dispensing mechanism 115 is able to move freely downward along the threaded shaft 114 without requiring the counterclockwise rotation of the advancing knob 104.

FIG. 14c illustrates the butter dispenser 100 of FIG. 14a with the retractable dispensing mechanism 115 in a fully retracted position. As illustrated in FIG. 14c, once the retractable dispensing mechanism 115 reaches the advancing knob 104, the female threaded mating members 118 of the retaining mechanism 125 are re-engaged with the threaded shaft 114 upon the threaded mating members 118 contact with the graduated valleys 142 in the threaded shaft support 112.

In operation, when the end of the stick of butter (not shown) is pressed against the platform 128 of the release mechanism 126, the retaining mechanism 125 is released from threaded shaft 114 and allowed to move freely downward until it re-engages with the threaded shaft 114 upon reaching the threaded shaft support 112. The stick of butter is received within the void 135 and the threaded shaft 114 is positioned through the center of the lower portion of the stick of butter to stabilize the stick of butter within the void 135.

As noted above, the female threaded mating members 118 of the releasable fasteners 116 are pushed inward toward the threaded shaft 114 to reengage the shaft when the retractable dispensing mechanism 115 is at the base of the dispenser 100. When the retractable dispensing mechanism 115 is forced to the bottom of the dispenser, the female threaded mating members 118 engage graduated valleys 142 of the threaded shaft support 112. Upon engagement, the angled tube ends 133 of release tube 130, which have wedged between the threaded shaft 114 and the tapered members 119 of the releasable fastener 116, are forced upward, thereby allowing the reengagement of the retaining mechanism 125 to the threaded shaft 114.

As further illustrated in FIG. 14c, when the retractable dispensing mechanism 115 is a the base of the dispenser 100, the lower end 146 of the extended exterior sidewalls 127 of the retaining mechanism 125 contact the perimeter stops 144 of the advancing knob 104, to stop the advancement of the retractable dispensing mechanism 115 further downward.

FIG. 15 illustrates a side perspective view of the retractable dispensing mechanism 115 of the butter dispenser 100 of FIG. 14a-c. As illustrated in FIG. 15, the retractable dispensing mechanism 115 includes the threaded shaft 114 that is coupled to and rotated by the advancing knob 104. The retractable dispensing mechanism 115 moves up and down along the threaded shaft 114 upon the turning of the advancing knob 104 in the clockwise and counter-clockwise directions, respectively. The retractable dispensing mechanism 115 includes a retaining mechanism 125 and a release mechanism 126. The retaining mechanism 125 includes a releasable inner fastener 116 that includes female threaded mating members 118 and downward extending exterior sidewalls 127. When the retaining mechanism 125 is in the fully retracted position, as illustrated in FIG. 16c, the lower end 146 of the exterior sidewalls 127 meets the perimeter stops 144 extending upward from the base of the advancing knob 104.

As further illustrated in FIG. 15, the releasing mechanism 126 is positioned above the retracting mechanism 125 for releasing the retracting mechanism 125 from the threaded shaft 114 to allow the releasing mechanism 126 to move downward along the threaded shaft 114 without the necessity of rotating the knob 104. The release mechanism 126 is spaced apart from the retaining mechanism 125 when no pressure is applied to the release mechanism 126. The spacing is illustrated by gap 134. The gap 134 is closed when pressure is applied to the release mechanism 126 and the retaining mechanism 125 is disengaged from the threaded shaft 114.

Figure 16A:
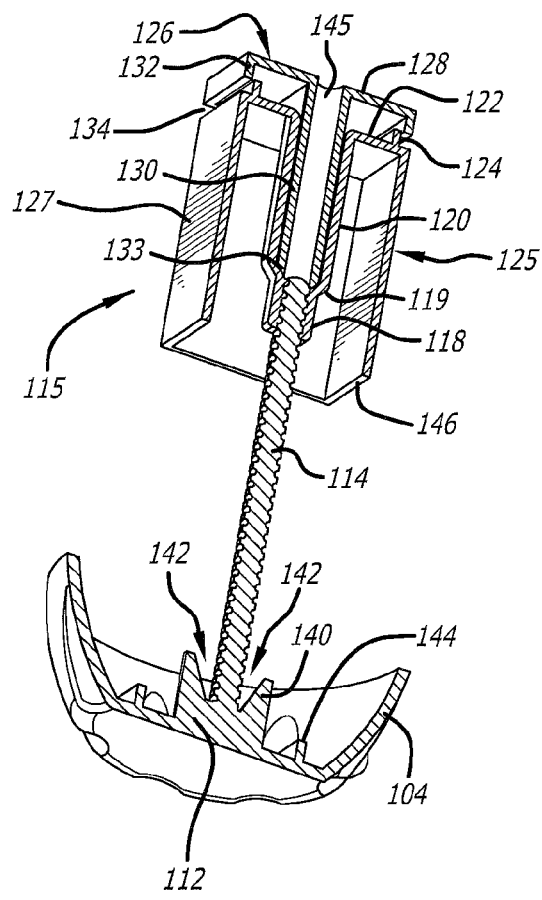
FIG. 16a illustrates a cross-section of the automatically retractable dispensing mechanism of the butter dispenser of FIG. 15 with the automatically retractable dispensing mechanism in the fully dispensed position.

FIG. 16a illustrates a cross-section of the automatic retractable dispensing mechanism 115 of the butter dispenser 100 of FIG. 15 with the retractable dispensing mechanism 115 is in the fully dispensed position. As illustrated, the retractable dispensing mechanism 115 includes a retaining mechanism 125 for retaining the retractable dispensing mechanism 115 in engagement with the threaded shaft 114 and a release mechanism 126 for releasing the retaining mechanism 125 from engagement with the shaft 114.

The retaining mechanism 125 includes interior positioned releasable fastener 116 that includes female threaded mating members 118 for engaging the threaded shaft 114 and moving the retractable dispensing mechanism 115 up and down the threaded shaft 114 in response to the rotation of the advancing knob 104. The releasable fastener 116 further includes tapered members 119 that gradually expand the diameter of the releasable fastener 116 upward and outward directly above the female threaded mating members 118 and a hollow tube 120 for receiving the release tube 130 of the release mechanism 126. The retaining mechanism 125 further includes an upper shelf 122 with raised stops 124 and extended exterior sidewalls 127 that slideably engage with the interior sidewalls of the hollow receiving sleeve 108.

The release mechanism 126 is positioned directly above upper shelf 122 of the retaining mechanism 125 and is generally of the same length and width as that of the retaining mechanism 125, which is also generally of the same length and width as the horizontal cross-section of the interior opening of the hollow receiving sleeve 108 (FIG. 14a-c). The release mechanism 126 includes a receiving platform 128, which includes a release tube 130 at its center which projects downward and into the hollow tube 120 of the retaining mechanism 125. The receiving platform 128 includes downward extending exterior sides 132. When the release mechanism 126 is pressed downward, the gap 134 is closed and the exterior sides 132 rest on the platform 122 of the retaining member 125 and the raised stops 124 rest on the underside of the platform 128 of the release mechanism 126.

Figure 16B:
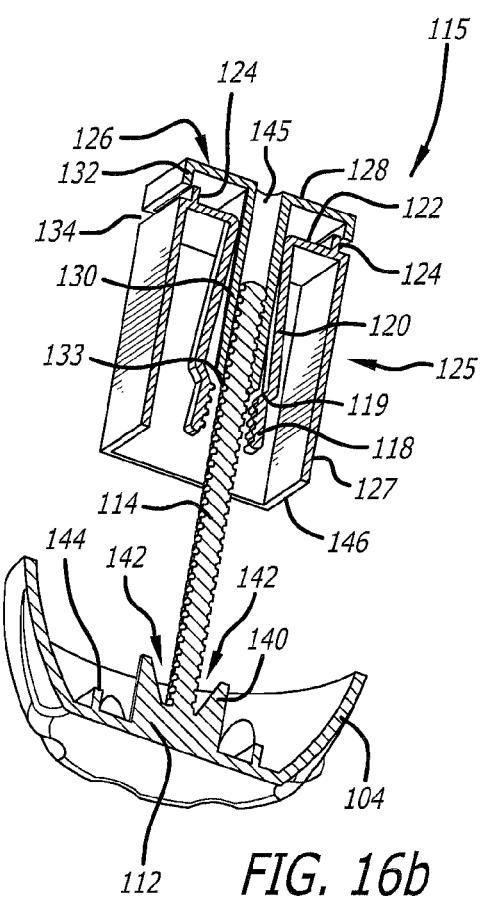
FIG. 16b illustrates the automatically retractable dispensing mechanism of FIG. 16a in the partially dispensed state.
Figure 16C:
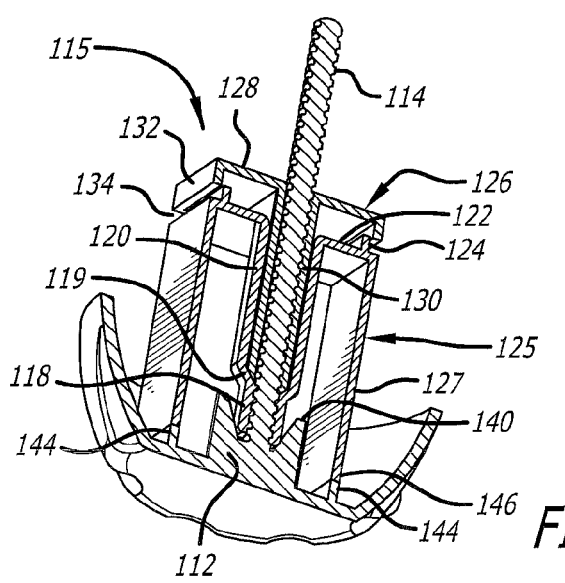
FIG. 16c illustrates the automatically retractable dispensing mechanism of FIG. 16a in the fully retracted state.

FIG. 16b illustrates the retractable mechanism 115 of FIG. 16a in the partially dispensed state. As illustrated, in operation, when the receiving platform 128 of the release mechanism 126 receives downward pressure, angled tube ends 133 at the lower end of the release tube 130 of the release mechanism 126 press upon the tapered member 119 of the retaining mechanism 125 pushing the female threaded mating members 118 away from the threaded shaft 114, thereby disengaging the retaining mechanism 125 from engagement with the threaded shaft 114. Upon disengagement, the retractable dispensing mechanism 115 is able to move freely downward along the threaded shaft 114 without requiring the counterclockwise rotation of the advancing knob 104.

FIG. 16c illustrates the retracting mechanism of FIG. 16a in the fully retracted state. As illustrated in FIG. 14c, once the retractable dispensing mechanism 115 reaches the advancing knob 104, the female threaded mating members 118 of the retaining mechanism 125 are re-engaged with the threaded shaft 114 upon contact with the graduated valleys 142 in the threaded shaft support 112. In particular, the female threaded mating members 118 of the releasable fasteners 116 are pushed inward toward the threaded shaft 114 to reengage the shaft when the retractable dispensing mechanism 115 is at the base of the butter dispenser 100. When the retractable dispensing mechanism 115 is forced to the bottom of the butter dispenser 100, the female threaded mating members 118 engage graduated valleys 142 of the threaded shaft support 112. Upon engagement, the angled tube ends 133 of release tube 130, which have wedged between the threaded shaft 114 and the tapered members 119 of the releasable fastener 116, are forced upward, thereby allowing the re-engagement of the retaining mechanism 125 to the threaded shaft 114.

Figure 17:
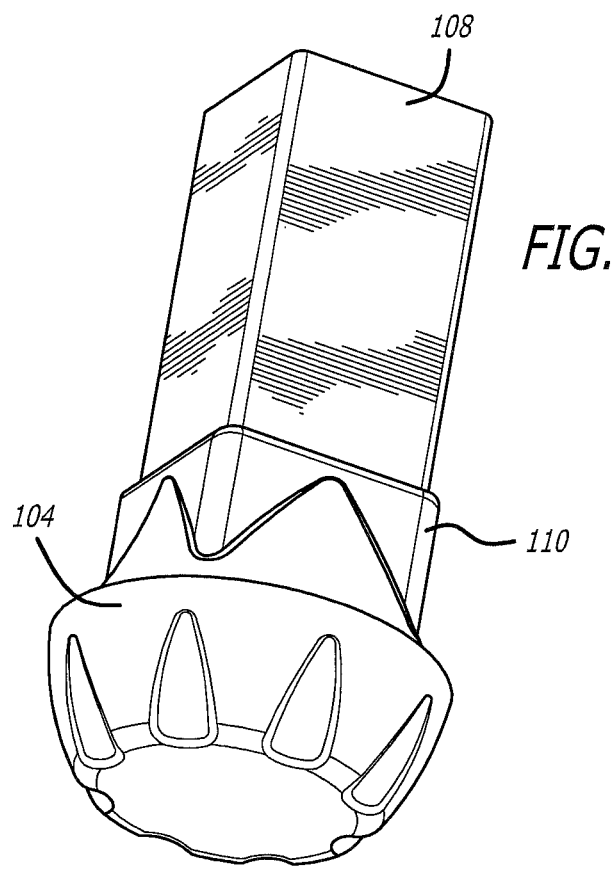
FIG. 17 illustrates a side perspective view of the butter dispensing mechanism of FIG. 14a having the outside housing and cap of the butter dispenser removed.

FIG. 17 illustrates a side perspective view of the butter dispenser 100 of FIG. 14a having the outside housing 102 and lid 106 of the butter dispenser 100 removed. A hollow receiving sleeve 108 is provided for receiving a stick of butter. The hollow receiving sleeve 108 is supported by sleeve supports 110. As illustrated in FIGS. 18a-20, the sleeve support 110 is a generally inverted v-shaped member having a first and second leg 111, 113 extending between the lower end of the hollow receiving sleeve 108 and the upper interior edge of the advancing knob 104. The first leg 111 is connected to and supports the hollow receiving sleeve 108. The second leg 113 is connect to the upper interior edge of the advancing knob 104 to further support the hollow receiving sleeve 108 central within the housing 102.

Figure 18A:
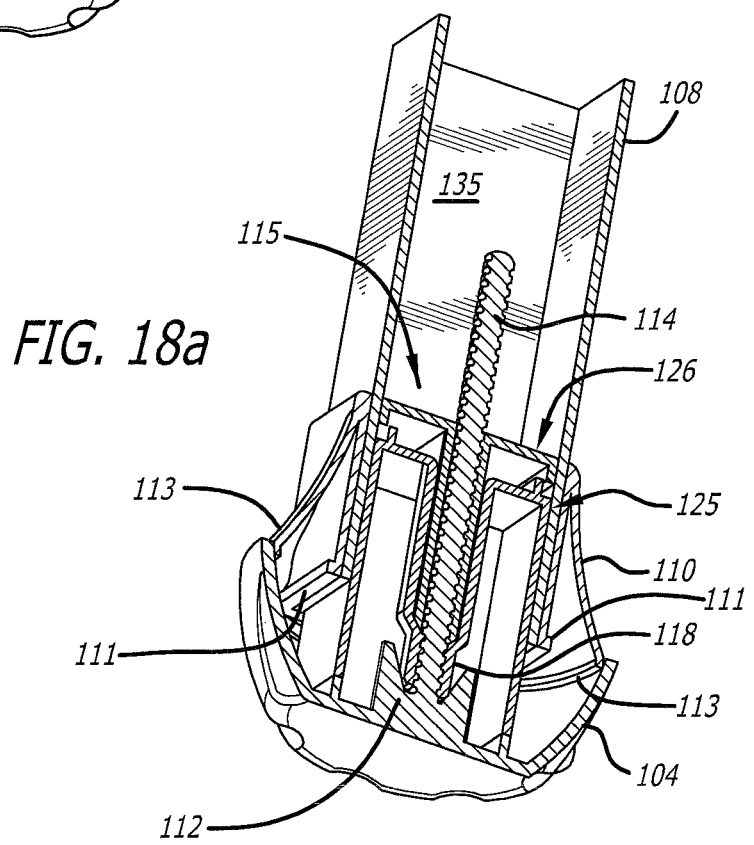
FIG. 18a illustrates the automatically retractable dispensing mechanism in the fully retracted position.

FIG. 18a illustrates the retractable dispensing mechanism 115 in the fully retracted position. In operation, when the end of the stick of butter (not shown) is pressed against the platform 128 of the release mechanism 126, the retaining mechanism 125 is released from threaded shaft 114 and allowed to move freely downward until it re-engages with the threaded shaft 114 upon reaching the threaded shaft support 112, which is the position illustrated in FIG. 18a. The stick of butter is received within the void 135 and the threaded shaft 114 is positioned through the center of the lower portion of the stick of butter to stabilize the stick of butter within the void 135.

FIG. 18b illustrates the retractable dispensing mechanism 115 in the fully dispensed position. As illustrated in FIG. 18b, in the fully dispensed position, the retractable dispensing mechanism 115 is positioned at the top of the hollow receiving sleeve 108 such that the receiving platform 128 of the release mechanism 126 is generally aligned with the top edge of the hollow receiving sleeve 108.

As illustrated, the retaining mechanism 125 has extended exterior sidewalls 127 that slideably engage with the interior sidewalls of the hollow receiving sleeve 108. The release mechanism 126 is positioned directly above upper shelf 122 of the retaining mechanism 125 and is generally of the same length and width as that of the retaining mechanism 125, which is also generally of the same length and width as the horizontal cross-section of the interior opening of the hollow receiving sleeve 108. The release mechanism 126 includes a receiving platform 128, which includes a hollow release tube 130 at its center which projects downward and into the hollow tube 120 of the retaining mechanism 125. The diameter of the hollow release tube 130 is wide enough to permit the threaded shaft 114 to extend through the hollow release tube 130.

FIG. 18c illustrates the retractable dispensing mechanism 115 in a partially retracted position. Again, as illustrated, when the receiving platform 128 of the release mechanism 126 receives downward pressure, angled tube ends 133 at the lower end of the release tube 130 of the release mechanism 126 press upon the tapered member 119 of the retaining mechanism 125 pushing the female threaded mating members 118 away from the threaded shaft 114, thereby disengaging the retaining mechanism 125 from engagement with the threaded shaft 114. Upon disengagement, the retractable dispensing mechanism 115 is able to move freely downward along the threaded shaft 114 without require the counterclockwise rotation of the advancing knob 104.

Figure 19:
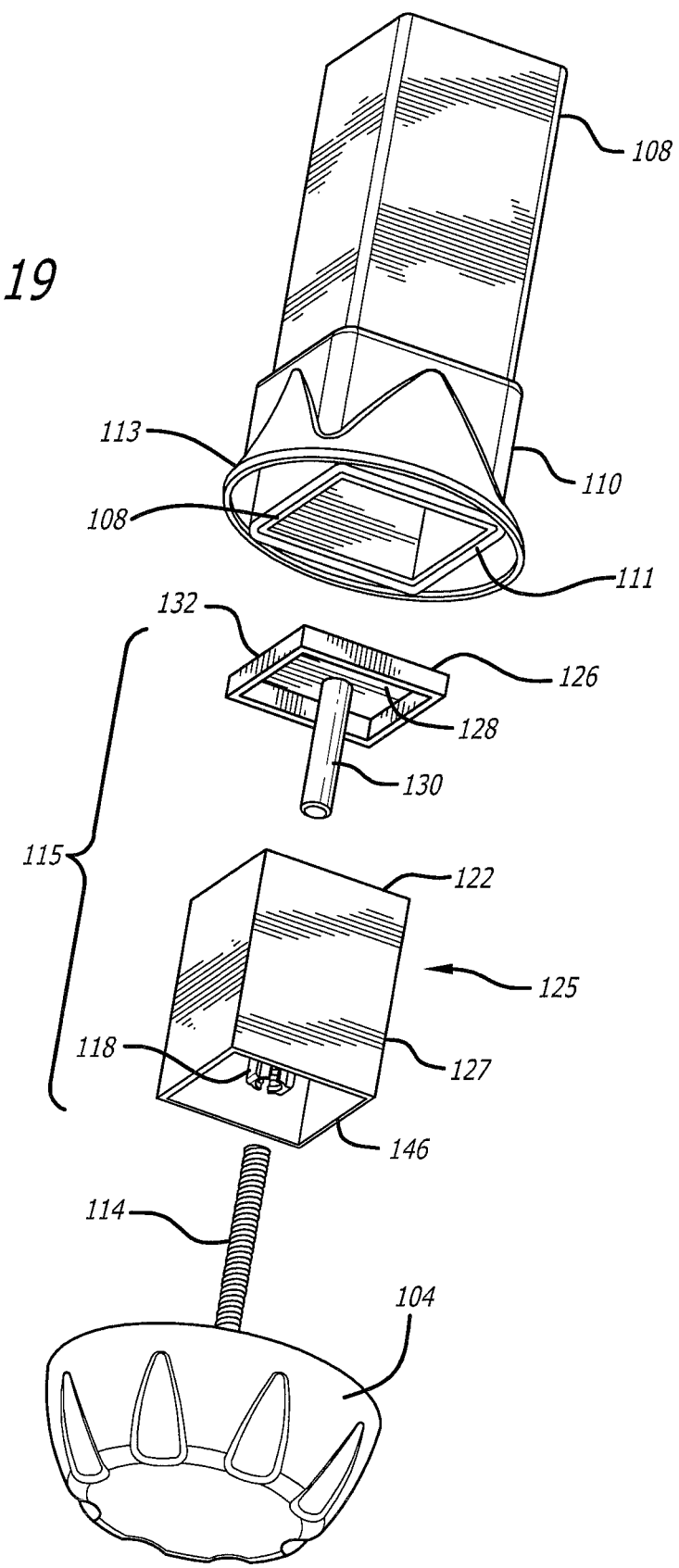
FIG. 19 is an exploded view of the butter dispensing device of FIG. 17 illustrating the automatically retractable dispensing mechanism for the butter dispenser.

FIG. 19 is an exploded view of the butter dispensing device 100 of FIG. 17 illustrating the retractable dispensing mechanism 115 for dispensing butter (not shown). As illustrated in FIG. 19, the advancing knob 104 includes and supports the threaded shaft 114, which extends upward from the center of the advancing knob 104. The advancing knob 104 and shaft 114 together communicate with one another in that the rotation of the advancing knob 104 causes the threaded shaft 114 to also rotate, which moves the retractable dispensing mechanism 115 up and down the shaft 114. The release mechanism 126 is positioned above the retaining mechanism 125 for releasing the retraining mechanism 125 from the threaded shaft 114 to allow the retaining mechanism 126 to move downward along the threaded shaft 114 without the necessity of rotating the knob 104. The platform 128, exterior sides 132 and release tube 130 of the release mechanism 126 are all illustrated by FIG. 19. The releasable fastener 116, upper shelf 122, extended exterior sidewalls 127 and the lower edge 146 of the retaining mechanism 125 are all illustrated in FIG. 19, as well as the receiving sleeve 108 and sleeve supports 110 of the butter mechanism 100.

Figure 20:
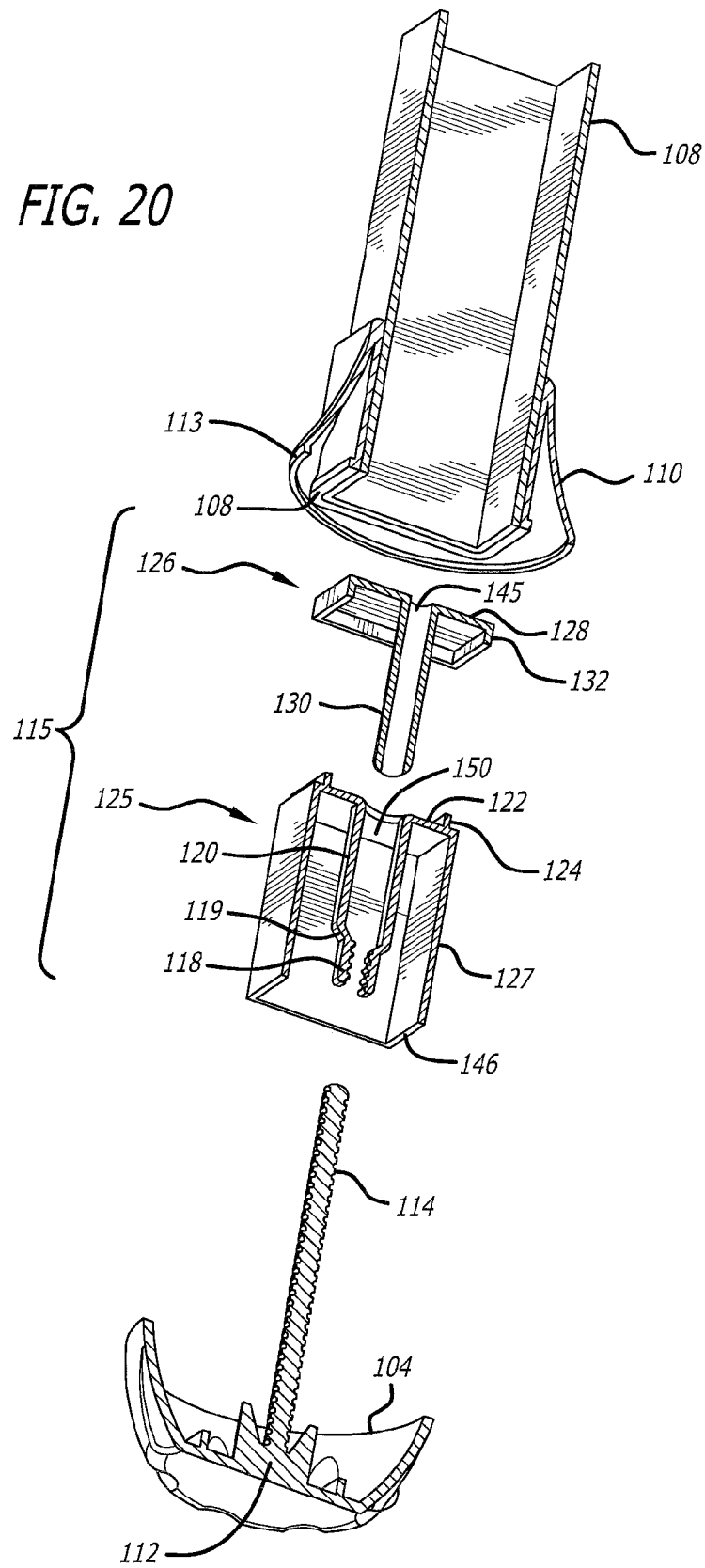
FIG. 20 illustrates a cross-section of the exploded view of the butter dispenser of FIG. 19.

FIG. 20 illustrates a cross-section of the exploded view of the butter dispenser 100 of FIG. 19. This view best illustrates the shaft opening 145 in the hollow release tube 130 and the female threaded mating members 118, tapered members 119 and hollow tube 120 of the retaining mechanism 125. This view further illustrates the opening 150 in the release tube 130 for receiving the hollow tube 120, which includes a shaft opening 145 for the threaded shaft 114.

Any of the above implementations may be designed to utilize heat resistant materials at the dispensing end of the butter dispenser to allow for the butter to be applied directly to hot surfaces during cooking preparations. Heat resistant materials, such as heat resistant plastics for use in kitchen applications are well known in the art.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A dispenser for dispensing a semi-solid substance, the dispenser comprising:
a dispensing mechanism;
a hollow sleeve member having an open top end and interior void for receiving and dispensing the semi-solid substance, the hollow sleeve member further having an open bottom end for engagement with the dispensing mechanism;
the dispensing mechanism further includes an advancing knob supporting the hollow sleeve member at the open bottom end of the hollow sleeve member, the advancing knob further including a thread shaft in rotational communication with the advancing knob and a receiving platform that is in engagement with the threaded shaft, whereby the threaded shaft extends upward from the advancing knob and through at least a portion of a central portion of the void within the hollow sleeve member;
the receiving platform is further positioned within the interior void of the hollow sleeve member and in releasable engagement with the threaded shaft such that the receiving platform moves upward along the shaft in response to the rotation of the advancing knob in one direction and moves downward along the shaft in response to the rotation of the advancing knob in another direction; and
wherein the receiving platform is automatically retractable when in the fully dispensed position and further includes a retaining mechanism and a release mechanism, whereby the retaining mechanism releasable engages the threaded shaft and the release mechanism communicates with the retaining mechanism to disengage the retaining mechanism from the threaded shaft to allow the receiving platform to automatically retract to the bottom end of the hollow sleeve member.

2. The dispenser of claim 1 where the hollow sleeve member further includes a window for viewing the amount of the semi-solid substance being dispensed.

3. The dispenser of claim 2 where the window further includes measurement indicators for quantifying the amount of semi-solid substance that has been dispensed or that remains in the dispenser.

4. The dispenser of claim 1 where the dispenser includes a knife.

5. The dispenser of claim 4 where the hollow sleeve member includes an opening for receiving the knife.

6. The dispenser of claim 1 where the hollow sleeve member is made of a heat resistant plastic material capable of being resistant to melting if positioned on a hot surface to dispense the semi-sold substance.

7. A dispenser for dispensing a semi-solid substance, the dispenser comprising:
   a dispensing mechanism;
   a hollow sleeve member having an open top end and interior void for receiving and dispensing the semi-solid substance, the hollow sleeve member further having an open bottom end for engagement with the dispensing mechanism;
   the dispensing mechanism further includes an advancing knob supporting the hollow sleeve member at the open bottom end of the hollow sleeve member, the advancing knob further including a thread shaft in rotational communication with the advancing knob, whereby the threaded shaft extends upward from the advancing knob and through at least a portion of a central portion of the void within the hollow sleeve member;
   the retractable dispensing platform positioned within the interior void of the hollow sleeve member in engagement with the threaded shaft such that the retractable dispensing platform moves upward along the shaft in response to the rotation of the advancing knob in one direction and moves downward along the shaft in response to the rotation of the advancing knob in another direction; and
   where the retractable dispensing platform further includes a retaining member and a release member, whereby the retaining member releasably engages the threaded shaft and the release member, in response to the application of pressure against the release member, forces the retaining member to disengage from the threaded shaft in a manner that permits the retaining member to move freely within along the threaded shaft without rotation of the shaft.

8. The dispenser of claim 7 where the hollow sleeve member further includes a window for view the amount of the semi-solid substance being dispensed.

9. The dispenser of claim 8 where the window further includes measurement indicators for quantifying the amount of semi-solid substance that has been dispensed or that remains in the dispenser.

10. The dispenser of claim 7 where the dispenser includes an integrated knife.

11. The dispenser of claim 7 where the hollow sleeve member is made of a heat resistant plastic material capable of being resistant to melting if positioned on a hot surface to dispense the semi-sold substance.

\* \* \* \* \*